US009018312B2

(12) United States Patent
Son et al.

(10) Patent No.: US 9,018,312 B2
(45) Date of Patent: *Apr. 28, 2015

(54) THERMOPLASTIC RESIN COMPOSITION HAVING IMPROVED IMPACT RESISTANCE

(75) Inventors: Se Bum Son, Anyang-Si (KR); Sung Hee Ahn, Seoul (KR); In Hwan Oh, Uiwang-Si (KR); Sung Duk Hwang, Seoul (KR)

(73) Assignee: Cheil Industries Inc., Gumi-si (KR)

( * ) Notice: Subject to any disclaimer, the term of this patent is extended or adjusted under 35 U.S.C. 154(b) by 852 days.

This patent is subject to a terminal disclaimer.

(21) Appl. No.: 11/965,013

(22) Filed: Dec. 27, 2007

(65) Prior Publication Data
US 2008/0160240 A1    Jul. 3, 2008

(30) Foreign Application Priority Data

Dec. 29, 2006  (KR) .......................... 10-2006-138889

(51) Int. Cl.
| C08K 5/02 | (2006.01) |
| C08K 5/136 | (2006.01) |
| C08K 5/06 | (2006.01) |
| C08K 3/10 | (2006.01) |
| B29D 22/00 | (2006.01) |
| C08L 55/02 | (2006.01) |
| C08F 279/02 | (2006.01) |
| C08F 279/04 | (2006.01) |
| C08L 25/12 | (2006.01) |
| C08L 51/04 | (2006.01) |
| C08L 63/00 | (2006.01) |
| C08L 67/02 | (2006.01) |
| C08K 3/22 | (2006.01) |
| C08K 5/03 | (2006.01) |
| C08L 83/04 | (2006.01) |

(52) U.S. Cl.
CPC ............... *C08L 55/02* (2013.01); *C08F 279/02* (2013.01); *C08F 279/04* (2013.01); *C08K 3/2279* (2013.01); *C08K 5/03* (2013.01); *C08K 5/06* (2013.01); *C08L 25/12* (2013.01); *C08L 51/04* (2013.01); *C08L 63/00* (2013.01); *C08L 67/02* (2013.01); *C08L 83/04* (2013.01)

(58) Field of Classification Search
USPC ............ 428/36.9; 523/179, 197, 541; 524/80, 524/96, 97, 100, 107, 109, 141, 341, 380, 524/409, 502, 115, 116, 117, 121, 122, 127, 524/136, 140, 508, 523; 525/68, 96, 117, 525/191
See application file for complete search history.

(56) References Cited

U.S. PATENT DOCUMENTS

| 4,027,073 A | 5/1977 | Clark |
| 4,585,818 A | 4/1986 | Jung et al. |
| 4,994,515 A | 2/1991 | Washiyama et al. |
| 5,039,729 A | 8/1991 | Brackenridge et al. |
| 5,055,235 A | 10/1991 | Brackenridge et al. |
| 5,290,855 A | 3/1994 | Kodama et al. |
| 5,635,565 A | 6/1997 | Miyajima et al. |
| 5,712,336 A | 1/1998 | Gareiss et al. |
| 5,989,723 A | 11/1999 | Tsai et al. |
| 6,117,371 A | 9/2000 | Mack |
| 6,447,913 B1* | 9/2002 | Watanabe et al. .............. 428/413 |
| 7,288,587 B2 | 10/2007 | Saitou et al. |
| 7,964,661 B2* | 6/2011 | Son et al. ....................... 524/408 |
| 7,977,421 B2 | 7/2011 | Ahn et al. |
| 7,981,960 B2 | 7/2011 | Ahn et al. |
| 8,080,611 B2 | 12/2011 | Park et al. |
| 8,119,720 B2 | 2/2012 | Son et al. |
| 8,193,272 B2 | 6/2012 | Kong et al. |
| 8,329,804 B2 | 12/2012 | Oh et al. |
| 8,334,332 B2 | 12/2012 | Son et al. |
| 8,389,628 B2 | 3/2013 | Park et al. |
| 2001/0041772 A1* | 11/2001 | Masubuchi et al. ........... 525/107 |
| 2005/0137311 A1 | 6/2005 | Muylem et al. |
| 2007/0049674 A1 | 3/2007 | Kim et al. |
| 2008/0088961 A1* | 4/2008 | Kushida ........................ 359/893 |
| 2008/0221255 A1 | 9/2008 | Ahn et al. |

(Continued)

FOREIGN PATENT DOCUMENTS

| EP | 0347116 A2 | 12/1989 |
| EP | 0489912 A1 | 6/1992 |

(Continued)

OTHER PUBLICATIONS

Machine Translation of JP 2005-272640A.*
Suzuhiro Chemica Co., Ltd. Product Info 3-1 (Antimony Trioxide [Fire Cut AT38 AT-3CN AT-3LT AT3CN-LP]) Available Online at: http://www.chemical-suzuhiro.co.jp/EN/pdf/e_product-info[AT3]2.0.pdf.*
International Search Report in counterpart International Application No. PCT/KR2007/006833, dated Mar. 25, 2008.
Office Action in commonly owned U.S. Appl. No. 12/628,258 mailed Mar. 24, 2011, pp. 1-22.
Office Action in commonly owned U.S. Appl. No. 12/647,620, mailed on Jan. 31, 2011, pp. 1-10.
Chinese Office Action in commonly owned Chinese Application No. 200910166160 dated Nov. 29, 2010, pp. 1-5.
English translation of Chinese Office Action in commonly owned Chinese Application No. 200910166160 dated Nov. 29, 2010, pp. 1-6.
Korean Office Action in commonly owned Korean Application No. 2008-128424 dated Oct. 29, 2010.
Office Action in commonly owned U.S. Appl. No. 12/647,601, mailed on Apr. 21, 2011, pp. 1-11.

(Continued)

Primary Examiner — Ling Choi
Assistant Examiner — Ronald Grinsted
(74) Attorney, Agent, or Firm — Additon, Higgins & Pendleton, P.A.

(57) ABSTRACT

A thermoplastic resin composition with improved impact resistance can include (A) about 30 to about 99 parts by weight of an epoxy group-containing styrenic polymer comprising ($A_1$) about 5 to about 100% by weight of an epoxy group-containing vinyl copolymer containing about 0.001 to about 5.0 mol % of an epoxy compound; and ($A_2$) about 0 to about 95% by weight of a rubber modified styrenic copolymer resin; (B) about 1 to about 70 parts by weight of a polyester resin; (C) about 0.001 to about 10 parts by weight of a silicone oil, per 100 parts by weight of a base resin comprising (A) and (B); (D) about 3 to about 20 parts by weight of a bromine-containing flame retardant, per 100 parts by weight of a base resin comprising (A) and (B); and (E) about 0.1 to about 6 parts by weight of a flame retardant aid, per 100 parts by weight of a base resin comprising (A) and (B).

37 Claims, No Drawings

(56) References Cited

U.S. PATENT DOCUMENTS

| | | |
|---|---|---|
| 2010/0029828 A1 | 2/2010 | Ahn et al. |
| 2010/0041800 A1 | 2/2010 | Son et al. |
| 2010/0113648 A1 | 5/2010 | Niessner et al. |
| 2010/0152342 A1 | 6/2010 | Kong et al. |
| 2010/0152372 A1 | 6/2010 | Oh et al. |
| 2010/0168292 A1 | 7/2010 | Son et al. |
| 2010/0168315 A1 | 7/2010 | Park et al. |
| 2010/0249314 A1 | 9/2010 | Park et al. |
| 2011/0160343 A1 | 6/2011 | Son et al. |

FOREIGN PATENT DOCUMENTS

| | | | |
|---|---|---|---|
| EP | 502333 A1 | 9/1992 | |
| EP | 0502333 A1 | 9/1992 | |
| JP | 01-163243 A | 6/1989 | |
| JP | 01-263149 | 10/1989 | |
| JP | 01-304153 A | 12/1989 | |
| JP | 05-295196 A | 11/1993 | |
| JP | 05-339479 A | 12/1993 | |
| JP | 06-322200 A | 11/1994 | |
| JP | 08-311300 A | 11/1996 | |
| JP | 10-175893 | 6/1998 | |
| JP | 2001-139742 A1 | 5/2001 | |
| JP | 14-97374 A | 4/2002 | |
| JP | 2005272640 A * | 10/2005 | ............ C08L 67/00 |
| JP | 18-111787 A | 4/2006 | |
| JP | 2006-143955 | 6/2006 | |
| JP | 2007-314619 | 12/2007 | |
| KR | 10-1991-0000910 A | 1/1991 | |
| KR | 910008803 B1 | 10/1991 | |
| KR | 10-1994-0026146 A | 12/1994 | |
| KR | 159256 B1 | 1/1999 | |
| KR | 2003-0056039 A | 7/2003 | |
| KR | 10-2004-0022374 A | 3/2004 | |
| KR | 2004-0079118 A | 9/2004 | |
| WO | 90/15103 A1 | 12/1990 | |
| WO | 92/00351 A1 | 1/1992 | |
| WO | 2008/082138 A1 | 7/2008 | |
| WO | 2009/084808 A1 | 7/2009 | |

OTHER PUBLICATIONS

Office Action in commonly owned U.S. Appl. No. 12/538,266, mailed on Oct. 27, 2010, pp. 1-7.
Notice of Allowance in commonly owned U.S Appl. No. 12/037,123 mailed on Feb. 1, 2011, pp. 1-8.
Notice of Allowance in commonly owned U.S Appl. No. 12/538,266 mailed on Feb. 17, 2011, pp. 1-8.
Office Action in commonly owned U.S. Appl. No. 12/512,134, mailed on Apr. 21, 2010, pp. 1-6.
Office Action in commonly owned U.S. Appl. No. 12/512,134, mailed on Aug. 27, 2010, pp. 1-5.
International Search Report in commonly owned International Application No. PCT/KR2008/006528, dated Jun. 1, 2009, pp. 1-4.
BASF, Joncryl ADR-4370-S, Mar. 13, 2007, pp. 1-9.
Villalobos et al., "Oligomeric chain extenders for economic reprocessing and recycling of condensation plastics," ScineceDirect, Energy 31, 2006, pp. 3227-3234.
Notice of Allowance in commonly owned U.S Appl. No. 12/512,134 mailed on Mar. 8, 2011, pp. 1-5.
International Preliminary Report on Patentability in commonly owned International Application No. PCT/KR2007/006833 dated Jun. 30, 2009, pp. 1-4.
Office Action in commonly owned U.S. Appl. No. 12/797,645 mailed Apr. 22, 2011, pp. 1-7.
U.S. Patent Office Advisory Action in commonly owned U.S. Appl. No. 12/037,123 dated Oct. 18, 2010, pp. 1-3.
International Preliminary Report on Patentability in counterpart International Application No. PCT/KR2007/006833 dated Dec. 29, 2006, pp. 1-4.
Notice of Allowance in commonly owned U.S. Appl. No. 12/647,620, mailed on Oct. 11, 2011, pp. 1-9.
Notice of Allowance in commonly owned U.S. Appl. No. 12/797,645 mailed Aug. 19, 2011, pp. 1-6.
Final Office Action in commonly owned U.S. Appl. No. 12/628,258, mailed on Sep. 12, 2011, pp. 1-10.
Notice of Allowance in commonly owned U.S. Appl. No. 12/628,258, mailed on Feb. 6, 2012, pp. 1-7.
Office Action in commonly owned U.S. Appl. No. 12/037,123 mailed on Jan. 25, 2010.
Office Action in commonly owned U.S. Appl. No. 12/037,123 mailed on Jun. 29, 2010.
Office Action in commonly owned U.S. Appl. No. 12/613,584 mailed May 31, 2012, pp. 1-8.
Korean Office Action in commonly owned Korean Application No. 2008-128424 dated May 27, 2011, pp. 1-4.
Office Action in commonly owned U.S. Appl. No. 12/884,576 mailed Dec. 22, 2011, pp. 1-8.
Final Office Action in commonly owned U.S. Appl. No. 12/884,576 mailed May 14, 2012, pp. 1-10.
Final Office Action in commonly owned U.S. Appl. No. 12/647,601 mailed Aug. 8, 2011, pp. 1-6.
Advisory Action in commonly owned U.S. Appl. No. 12/647,601 mailed Nov. 16, 2011, pp. 1-4.
Office Action in commonly owned U.S. Appl. No. 12/647,601 mailed May 9, 2012, pp. 1-5.
Office Action in commonly owned U.S. Appl. No. 12/613,584 mailed Jan. 12, 2012, pp. 1-8.
Final Office Action in commonly owned U.S. Appl. No. 12/613,584 mailed May 31, 2012, pp. 1-9.
Notice of Allowance in commonly owned U.S. Appl. No. 12/613,584 mailed Aug. 6, 2012, pp. 1-9.
Notice of Allowance in commonly owned U.S. Appl. No. 12/884,576 mailed Aug. 6, 2012, pp. 1-9.
Final Office Action in commonly owned U.S. Appl. No. 12/647,601 mailed Aug. 21, 2012, pp. 1-4.
Notice of Allowance in commonly owned U.S. Appl. No. 12/647,601 mailed Nov. 1, 2012, pp. 1-7.
Office Action in commonly owned U.S. Appl. No. 12/797,645 mailed Apr. 22, 2011, pp. 1-6.
Notice of Allowance in commonly owned U.S. Appl. No. 12/797,645 mailed Aug. 18, 2011, pp. 1-6.

* cited by examiner

THERMOPLASTIC RESIN COMPOSITION HAVING IMPROVED IMPACT RESISTANCE

CROSS-REFERENCE TO RELATED APPLICATION

This non-provisional application claims priority under 35 USC Section 119 from Korean Patent Application No. 2006-138889, filed on Dec. 29, 2006, which is hereby incorporated by reference in its entirety.

FIELD OF THE INVENTION

The present invention relates to a thermoplastic resin composition having improved impact resistance.

BACKGROUND OF THE INVENTION

Generally, rubber modified styrenic resins can have good mold processability and mechanical strength and have accordingly been widely used in the production of internal or external parts of electric/electronic goods and office equipment.

However, rubber modified styrenic resins can readily catch on fire. Accordingly, rubber modified styrenic resins are subject to various mandatory controls on flammability for safety reasons in the United States, Europe, and other countries, and are required to have high flame retardancy to meet the Underwriter's Laboratories Standard for use in the housing of electric appliances. Therefore, efforts are on-going to improve the flame retardancy of rubber modified styrenic resins.

Widely known methods for imparting flame retardancy to rubber modified styrenic resins include the addition of halogen-containing flame retardants, phosphorus-containing flame retardants, and inorganic flame retardants. Flame retardant aids may also be employed in combination with flame retardants to further increase flame retardancy.

Currently, electric/electronic products and office equipment are becoming larger overall, yet thinner. When rubber modified styrene resins are employed in such a large, yet thin, product, it can be necessary to add a large amount of flame retardant to obtain sufficient flame retardancy. As a result, impact resistance and rigidity of rubber modified styrene resins may decrease.

Polyester resins typically have a structure including short chains, and thus may not bend easily. Accordingly, polyester resins can have good rigidity, electrical properties, weather resistance, heat resistance, and the tensile strength of polyester resins may not be affected even after long term exposure to high temperatures. Further, crystalline polyester resins have good resistance to various oils, such as diesel oil.

However, the properties of polyester resins can degrade when they are exposed to acid or alkali for a long time at a high temperature due to ester bonds in the polyester chain. Thus, reinforcing agents such as glass fiber can be added to the polyester resins when polyester resins are employed as a structural material. If reinforcing agents are not added, it is difficult to use polyester resins as a structural material produced by injection molding.

It can be particularly difficult to impart flame retardancy to polyester resin because of flame dripping due to very rapid degradation of the polymer during combustion. Accordingly, in order to obtain flame retardancy, reinforcing agents such as glass fiber are added to polyester resin, because polyester resin alone is not flame retardant.

Recent attempts to impart flame retardancy to polyester resins have included alloying polyester with rubber modified styrene resin. The impact resistance of the alloy, however, is significantly decreased. Hence, the alloy cannot be used as a structural material.

SUMMARY OF THE INVENTION

The present invention includes a thermoplastic resin composition having improved impact resistance and good flame retardancy. The thermoplastic resin composition of the invention can include a silicone oil in combination with a base resin comprising a polyester resin and an epoxy group-containing styrenic polymer. The resultant thermoplastic resin can be useful as a structural material and can also be useful in the production of external components of electric/electronic goods.

The foregoing resin composition can include (A) about 30 to about 99 parts by weight of an epoxy group-containing styrenic polymer comprising ($A_1$) about 5 to about 100% by weight of an epoxy group-containing vinyl copolymer containing about 0.001 to about 5.0 mol % of an epoxy compound; and ($A_2$) about 0 to about 95% by weight of a rubber modified styrenic copolymer resin; (B) about 1 to about 70 parts by weight of a polyester resin; (C) about 0.001 to about 10 parts by weight of a silicone oil, per 100 parts by weight of a base resin comprising (A) and (B); (D) about 3 to about 20 parts by weight of a bromine-containing flame retardant, per 100 parts by weight of a base resin comprising (A) and (B); and (E) about 0.1 to about 6 parts by weight of a flame retardant aid, per 100 parts by weight of a base resin comprising (A) and (B).

In exemplary embodiments of the invention, the epoxy group-containing vinyl polymer ($A_1$) is prepared by polymerizing a mixture comprising about 0.001 to about 5.0 mol % of an epoxy group-containing unsaturated epoxy compound ($A_{11}$) and about 99.999 to about 95 mol % of a vinyl compound ($A_{12}$).

In exemplary embodiments of the invention, the vinyl compound ($A_{12}$) comprises an aromatic vinyl monomer and a monomer copolymerizable with the aromatic vinyl monomer.

In exemplary embodiments of the invention, the rubber modified styrenic copolymer resin ($A_2$) comprises ($A_{21}$) about 20 to about 100% by weight of a graft copolymer resin and ($A_{22}$) about 0 to about 80% by weight of a copolymer resin.

In exemplary embodiments of the invention, the polyester resin (B) may be a polyester resin in which inorganic particles are mixed therein.

In exemplary embodiments of the invention, the silicone oil (C) has a viscosity of about 1 to about 10,000 cPs (at 25° C.)

The resin composition may further comprise additives such as heat stabilizers, dyes, pigments, lubricants, releasing agents, dispersant, anti-dripping agents, weather stabilizers, inorganic fillers, inorganic fibers and combinations thereof.

Another aspect of the invention provides a pellet extruded from the foregoing resin composition.

Another aspect of the invention provides an electric/electronic housing molded from the foregoing resin composition.

Another aspect of the invention provides a structural material containing the foregoing resin composition.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

(A) Epoxy Group-Containing Styrenic Polymer

The epoxy group-containing styrenic polymer is part of a base resin including the epoxy group-containing styrenic polymer and a polyester resin, discussed in more detail below. The epoxy group-containing styrenic polymer is used in the thermoplastic resin composition of the invention in an amount of about 30 to about 99 parts by weight, based on the total weight of the thermoplastic resin composition.

The epoxy group-containing styrenic polymer of the present invention comprises ($A_1$) an epoxy group-containing vinyl copolymer comprising about 0.001 to about 5.0 mol % of an epoxy group, and ($A_2$) a rubber modified styrenic copolymer resin. In exemplary embodiments, the epoxy group-containing styrenic polymer comprises ($A_1$) about 5 to about 100% by weight of an epoxy group-containing vinyl copolymer comprising about 0.001 to about 5.0 mol % of an epoxy group and ($A_2$) about 0 to about 95% by weight of a rubber modified styrenic copolymer resin.

(A1) Epoxy Group-Containing Vinyl Copolymer

The epoxy group-containing vinyl copolymer of the present invention can be prepared by polymerizing a monomer mixture comprising an epoxy group-containing unsaturated epoxy compound ($A_{11}$) and a vinyl compound ($A_{12}$) so that the unsaturated epoxy group is present in the vinyl copolymer. The monomer mixture may comprise about 0.001 to about 5.0 mol % of an epoxy group-containing unsaturated epoxy compound ($A_{11}$) and about 99.999 to about 95 mol % of a vinyl compound ($A_{12}$).

($A_{11}$) Epoxy Compound

The epoxy compound used in the invention can be represented by the following chemical formula 1.

[Chemical formula 1]

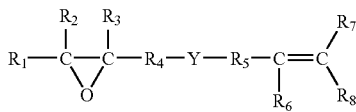

wherein:

$R_1$, $R_2$, $R_3$, $R_6$, $R_7$ and $R_8$ are each independently hydrogen, saturated or unsaturated $C_1$-$C_{12}$ alkyl, $C_6$-$C_{14}$ aryl, or alkyl-substituted aryl (for example saturated or unsaturated $C_1$-$C_{12}$ alkyl-substituted $C_6$-$C_{14}$ aryl); and Y is an ether group (—O—), carboxyl group (—O—[C=O]—, —[O=C]—O—), $C_1$-$C_{12}$ alkylene, $C_6$-$C_{14}$ arylene, or alkyl-substituted arylene (for example saturated or unsaturated $C_1$-$C_{12}$ alkyl-substituted $C_6$-$C_{14}$ arylene);

with the proviso that when Y is an ether group (—O—) or carboxyl group (—O—[C=O]—, —[O=C]—O—), $R_4$ and $R_5$ are each independently $C_1$-$C_{12}$ alkylene, $C_6$-$C_{14}$ arylene or alkyl-substituted arylene (for example, saturated or unsaturated $C_1$-$C_{12}$ alkyl-substituted $C_6$-$C_{14}$ arylene); and when Y is $C_1$-$C_{12}$ alkylene, $C_6$-$C_{14}$ arylene or alkyl-substituted arylene, Y represents (R4-Y—R5) structure.

Examples of the epoxy compound may include, but are not limited to, epoxy alkyl acrylate, allyl glycidyl ester, aryl glycidyl ester, glycidyl methacrylate, glycidyl acrylate, butadiene monoxide, vinyl glycidyl ether, glycidyl itaconate, and the like. These epoxy compounds can be used alone or in combination with one another.

In exemplary embodiments of the invention, the epoxy compound is added as a comonomer in an amount of about 0.001 to about 5 mol %, for example about 0.1 to about 5 mol %, and as another example about 1 to about 5 mol %. If the amount of the epoxy compound is less than about 0.001 mol %, it can be difficult to improve impact strength. When the amount of the epoxy compound exceeds about 5 mol %, there can be a problem of gelation during an extrusion process.

($A_{12}$) Vinyl Compound

The vinyl compound of the present invention may comprise aromatic vinyl monomers and a monomer copolymerizable with the aromatic vinyl monomer.

Examples of the aromatic vinyl monomers may include, but are not limited to, styrene, α-methyl styrene, β-methyl styrene, p-methyl styrene, p-t-butyl styrene, ethyl styrene, vinyl xylene, monochlorostyrene, dichlorostyrene, dibromostyrene, vinyl naphthalene and the like. These aromatic vinyl monomers can be used alone or in combination with one another.

The monomer copolymerizable with the aromatic vinyl monomer may be used alone or in combination with one or more other copolymerizable monomers. Examples of the monomer copolymerizable with the aromatic vinyl monomer may include, but are not limited to, unsaturated nitrile monomers such as acrylonitrile, methacrylonitrile and ethacrylonitrile, and the like, and combinations thereof.

The ratio of the aromatic vinyl monomers to the monomer copolymerizable with the aromatic vinyl monomer can be determined by the ratio of monomers of the rubber modified styrenic copolymer resin (A2) excluding rubber and compatibility. The vinyl compound can include about 40 to about 90% by weight of an aromatic vinyl monomer and about 10 to about 60% by weight of a copolymerizable monomer with the aromatic vinyl monomer. As another example, the vinyl compound can include about 50 to about 80% by weight of aromatic vinyl monomer and about 20 to about 50% by weight of copolymerizable monomer with the aromatic vinyl monomer. If the amount of the aromatic vinyl monomers is less than about 40% by weight, the viscosity can significantly rise, which can negatively affect molding performance. When the amount of the aromatic vinyl monomers is more than about 90% by weight, it can be difficult to improve mechanical strength.

Other monomers such as acrylic acid, methacrylic acid, maleic anhydride, N-substituted maleimide, and the like, and combinations thereof may be optionally contained in the vinyl compound ($A_{12}$) to improve processability and heat resistance. The monomers for providing processability and heat resistance may be used in amount of about 0 to about 30% by weight, for example about 1 to about 20% by weight, and as another example about 2 to about 15% by weight, based on the total weight of the vinyl compound ($A_{12}$).

(A2) Rubber Modified Styrenic Copolymer Resin

The rubber modified styrenic copolymer resin according to the present invention can be a polymer in which rubber phase polymers are dispersed in the form of particles in a matrix (continuous phase) comprising an aromatic vinyl polymer. In exemplary embodiments of the invention, the rubber modified aromatic vinyl resins may be prepared by polymerizing the aromatic vinyl group-containing monomers with rubbers. In exemplary embodiments, other monomers copolymerizable with the aromatic vinyl monomers may also be employed along with the aromatic vinyl monomers. The rubber modified styrenic copolymer resin may be prepared by methods such as emulsion polymerization, suspension polymerization, bulk polymerization, and by extrusion of a graft copolymer resin and a copolymer resin. In bulk polymerization, both a graft copolymer resin and a copolymer resin are prepared together in one process. In other polymerizations, the graft copolymer resin and the copolymer resin may be prepared separately. Regardless of the polymerization technique used, the rubber content in a final rubber modified styrenic copolymer resin can be about 5 to about 30% by weight.

In exemplary embodiments of the invention, the Z-average size of rubber particles of the rubber modified styrenic copolymer resin ($A_2$) can range from about 0.1 to about 6.0 µm, for example from about 0.25 to about 3.5 µm, to obtain desirable properties during blending of the rubber modified styrenic copolymer resin and polyester resin.

In the rubber modified styrenic copolymer resin of the present invention, the graft copolymer resin can be used alone or in combination with the copolymer resin, depending on the compatibility thereof.

($A_{21}$) Graft Copolymer Resin

The graft copolymer resin ($A_{21}$) may be prepared by graft-polymerizing rubbery polymer, aromatic vinyl monomer, and copolymerizable monomer with the aromatic vinyl monomer and optionally other monomer(s) imparting processability and heat resistance.

Examples of the rubbery polymers may include diene rubbers such as polybutadiene, poly(styrene-butadiene), poly(acrylonitrile-butadiene), and the like; saturated rubbers in which hydrogen is added to a diene rubber; isoprene rubbers; acryl rubbers such as polybutyl acrylic acid; and terpolymers of ethylene-propylene-diene (EPDM), and the like, and combinations thereof. The content of rubbery polymer in the graft copolymer resin may be about 5 to about 65 parts by weight, for example about 20 to about 60 parts by weight, based on the total weight of the graft copolymer resin ($A_{21}$). The average size of the rubber particles can range from about 0.1 to about 4 µm taking into account the desired impact strength and appearance of the resin composition.

Examples of the aromatic vinyl monomer may include, but are not limited to, styrene, α-methyl styrene, β-methyl styrene, p-methyl styrene, p-t-butylstyrene, ethylstyrene, vinyl xylene, monochlorostyrene, dichlorostyrene, dibromostyrene, vinyl naphthalene and the like, and combinations thereof. The aromatic vinyl monomer may be used in an amount of about 35 to about 95 parts by weight based on the total weight of the graft copolymer resin ($A_{21}$).

The graft copolymer resin ($A_{21}$) can include at least one other monomer copolymerizable with the aromatic vinyl monomer. Examples of monomers which may be copolymerized with the aromatic vinyl monomers may include a cyanide vinyl-containing compound such as acrylonitrile or an unsaturated nitrile-containing compound such as methacrylonitrile and ethacrylonitrile. These monomers may be used alone or in combination of two or more. The copolymerizable monomer with the aromatic vinyl monomer may be used in an amount of about 1 to about 20 parts by weight, based on the total weight of the graft copolymer resin ($A_{21}$).

Examples of the monomer imparting processability and heat resistance may include without limitation acrylic acid, methacrylic acid, maleic anhydride, N-substituted maleimide, and the like, and combinations thereof. The monomer imparting process ability and heat resistance may be used in an amount of about 0 to about 15 parts by weight, based on the total weight of the graft copolymer resin ($A_{21}$).

($A_{22}$) Copolymer Resin

The copolymer resin of the present invention may be prepared by copolymerizing aromatic vinyl monomer, copolymerizable monomer with the aromatic vinyl monomer and optionally other monomer(s) imparting processability and heat resistance. The monomer ratio may be adjusted depending on the monomer ratio of the graft copolymer resin ($A_{21}$) excluding rubber and compatibility.

Examples of the aromatic vinyl monomer may include, but are not limited to, styrene, α-methyl styrene, β-methyl styrene, p-methyl styrene, p-t-butyl styrene, ethylstyrene, vinyl xylene, monochlorostyrene, dichlorostyrene, dibromostyrene, vinyl naphthalene, and the like, and combinations thereof. The aromatic vinyl monomer can be used in an amount of about 60 to about 90 parts by weight, based on the total weight of the copolymer resin ($A_{22}$).

Examples of the copolymerizable monomer with the aromatic vinyl monomer may be, for example, a vinyl cyanide compound such as acrylonitrile or an unsaturated nitrile compound such as ethacrylonitrile and methacrylonitrile, and may be used alone or in combination of two or more. The amount of the copolymerizable monomer with the aromatic vinyl monomer can be about 10 to about 40 parts by weight, based on the total weight of the copolymer resin ($A_{22}$).

Examples of the monomers imparting processability and heat resistance may include without limitation acrylic acid, methacrylic acid, maleic anhydride, N-substituted maleimide and the like, and combinations thereof. The amount of the monomers imparting processability and heat resistance can be about 0 to about 30 parts by weight, based on the total weight of the copolymer resin ($A_{22}$).

In exemplary embodiments of the invention, the rubber modified styrenic copolymer resins can be copolymer resins of acrylonitrile-butadiene-styrene (ABS), copolymer resins of acrylonitrile-ethylenepropylene rubber-styrene (AES), copolymer resins of acrylonitrile-acrylic rubber-styrene (AAS), and the like, and combinations thereof. The rubber modified styrenic copolymer resin (A2) can include about 20 to about 100% by weight of the graft copolymer resin ($A_{21}$) and about 0 to about 80% by weight of the copolymer resin ($A_{22}$).

(B) Polyester Resin

The polyester used in the present invention is polyester resin having an intrinsic viscosity of about 0.3 to about 1.0 g/dL or a copolymer thereof.

In exemplary embodiments of the invention, the polyester resin may be prepared by condensation polymerization reaction of acid or ester such as terephthalic acid (TPA), isophthalic acid (IPA), 1,2-naphthalene dicarboxylic acid, 1,4-naphthalenedicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid, 2,7-naphthalenedicarboxylic acid, aromatic dicarboxylate in which acid is substituted with a dimethyl group such as dimethyl terephthalate (DMT) and dimethyl isophthalate, alkyl ester of naphthalene dicarboxylate, dimethyl-1,2-naphthalate, dimethyl-1,5-naphthalate, dimethyl-1,7-naphthalate, dimethyl-1,7-naphthalate, dimethyl-1,8-naphthalate, dimethyl-2,3-naphthalate, dimethyl-2,6-naphthalate, dimethyl-2,7-naphthalate, and the like, and combinations thereof; and diols having 2 to 12 carbon atoms such as ethylene glycol, 1,2-propylene glycol, 1,3-propylene glycol, 2,2-dimethyl-1,3-propanediol, 2,2-dimethyl-1,3-propylene glycol, 1,3-butanediol, 1,4-butanediol, 1,5-pentanediol, 1,6-hexanediol, 1,3-cyclohexane dimethanol, 1,4-cyclohexane dimethanol, and the like, and combinations thereof. The condensation polymerization reaction can be easily carried out by a person of ordinary skill in the art.

In exemplary embodiments of the invention, the polyester resin (B) may be a polyester resin in which inorganic particles are mixed therein. Examples of suitable inorganic particles useful in the invention can include without limitation titanium dioxide ($TiO_2$), silicone dioxide ($SiO_2$), aluminum hydroxide ($Al(OH)_3$) and the like, and combinations thereof.

In the present invention, the polyester resin is part of a base resin including the polyester resin and the epoxy group containing styrenic polymer and is used in the thermoplastic resin composition in an amount of about 1 to about 70 parts by weight, for example about 5 to about 50 parts by weight, and as another example about 10 to about 40 parts by weight, based on the total weight of the thermoplastic resin composition. If the amount of the polyester is more or less than the above range, the resin composition obtained therefrom may have low impact strength and flame retardancy.

(C) Silicone Oil

The silicone oil used in the present invention can be represented by the following chemical formula 2.

[Chemical formula 2]

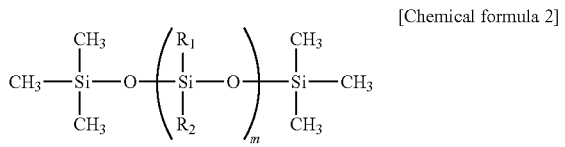

wherein $R_1$ and $R_2$ are each independently $C_{1-6}$ alkyl, phenyl, $C_{6-20}$ alkyl-substituted phenyl, and hydrogen; and m is about 10 to about 10,000.

For example, $R_1$ can be a methyl group or phenyl group, and $R_2$ can be a methyl group, phenyl group or hydrogen.

The silicone oil can be prepared by conventional methods which will be evident to those of ordinary skill in the art and is commercially available.

In the present invention, the silicone oil has a viscosity of about 1 to about 10,000 cPs (at 25° C.). The silicone oil may used in an amount of from about 0.001 to about 10 parts by weight, per 100 parts by weight of a base resin comprising (A) and (B), for example about 0.01 to about 5 parts by weight, and as another example about 0.1 to about 3 parts by weight. If the amount of the silicone oil is less than about 0.001, the impact strength may not be improved sufficiently. If the amount of the silicone oil is more than about 10 parts by weight, the impact strength and the flame retardancy may decrease.

(D) Bromine-Containing Flame Retardant

The bromine-containing flame retardant of the present invention can be a compound containing bromine in an amount of about 40 to about 87% by weight.

Examples of the bromine-containing flame retardant may include without limitation tetrabromobisphenol A, decabromodiphenyl oxide, decabrominated diphenyl ethane, 1,2-bis(tribromophenyl)ethane, brominated epoxy oligomer having a molecular weight of about 600 to about 8,000, octabromotrimethylphenyl indane, bis(2,3-dibromopropyl ether), tris(tribromophenyl)triazine, brominated aliphatic or aromatic hydrocarbon, and the like. These bromine-containing flame retardant may be used alone or in combination of two or more.

The bromine-containing flame retardant can be used in an amount of about 3 to about 20 parts by weight, for example about 5 to about 17 parts by weight, per 100 parts by weight of a base resin comprising (A) and (B).

(E) Flame Retardant Aid

The flame retardant aid of the present invention contains antimony. In exemplary embodiments of the invention, the flame retardant aid comprises antimony in an amount of about 75 to about 87% by weight. In exemplary embodiments of the invention, the flame retardant aid is antimony oxide.

Examples of the antimony oxide may include without limitation antimony trioxide, antimony pentoxide and combinations thereof.

For antimony trioxide, at least 50% of the antimony trioxide particles can have a size of about 0.01 to about 6 μm, for example about 0.02 to about 3.0 μm.

For antimony pentoxide, at least 50% of the antimony pentoxide particles can have a size of about 0.01 to about 1 μm, for example about 0.02 to about 0.5 μm.

The flame retardant aid of the present invention may be used in an amount of about 0.1 to about 6 parts by weight, for example about 1 to about 4 parts by weight, per 100 parts by weight of a base resin comprising (A) and (B).

Other additives may be included in the resin composition of the present invention. Examples of such additives include without limitation heat stabilizers, dyes and pigments, lubricants, releasing agents, dispersant, anti-dripping agents, weather stabilizers, inorganic fillers, inorganic fibers and combinations thereof.

The resin composition according to the present invention can be prepared by a conventional process. For example, all the components and additives can be mixed together and extruded through an extruder and can be prepared in the form of pellets.

The resin composition of the present invention can have excellent impact resistance compared with conventional flame retardant resins, and can be molded into various products. The resin composition of the invention can be particularly suitable for the production of electric or electronic housings, computer or office equipment housings, structural materials and so on.

The invention may be better understood by reference to the following examples which are intended for the purpose of illustration and are not to be construed as in any way limiting the scope of the present invention, which is defined in the claims appended hereto.

EXAMPLES ($A_1$) Epoxy Group-Containing Vinyl Copolymer (A1-1) Epoxy Group-Containing Vinyl Copolymer (GMA 1 mol %-SAN)

To a mixture comprising 100 parts by weight of monomer mixture including 1.0 mol % of glycidyl methacrylate and 99.0 mol % of vinyl compound including 70 parts by weight of styrene and 30 parts by weight of acrylonitrile and 120 parts by weight of deionized water are added 0.2 parts by weight of azobisisobutyronitrile, 0.4 parts by weight of tricalcium phosphate, and 0.2 parts by weight of mercaptan-containing chain transfer agent. Then the temperature of the mixture is increased from room temperature to 80° C. for 60 minutes, maintained at this temperature for 180 minutes, and epoxy group-containing styrene-acrylonitrile copolymer resin (GMA-SAN) is obtained. The resultant product is washed, dehydrated and dried to obtain epoxy group-containing styrene-acrylonitrile copolymer resin (GMA-SAN) in the form of powder.

(A1-2) Epoxy Group-Containing Vinyl Copolymer (GMA 5 mol %-SAN)

GMA 5 mol %-SAN is prepared in the same manner as in GMA 1 mol %-SAN (A1-1) except that a monomer mixture including 5.0 mol % of glycidyl methacrylate and 95.0 mol % of vinyl compound including 70 parts by weight of styrene and 30 parts by weight of acrylonitrile is used.

(A2) Rubber Modified Styrene Resin (A$_{21}$) Graft Copolymer Resin 50 parts of butadiene rubber latex (solid content), 36 parts of styrene, 14 parts of acrylonitrile, and 150 parts of deionized water are mixed. To the mixture, 1.0 part of potassium oleate, 0.4 parts of cumen hydroperoxide, 0.2 parts of mercaptan-containing chain transfer agent, 0.4 parts of glucose, 0.01 parts of ferrous sulfate hydrate, and 0.3 parts of sodium pyrophosphate are added. The blend is kept at 75° C. for 5 hours to obtain g-ABS latex. To the g-ABS latex, 0.4 parts of sulfuric acid is added, coagulated and dried to obtain graft ABS copolymer resin (g-ABS) in powder form.

(A$_{22}$) Copolymer Resin 75 parts of styrene, 25 parts of acrylonitrile, 120 parts of deionized water and 0.2 parts of azobisisobutylonitrile (AIBN) are mixed. To the mixture, 0.4 parts of tricalciumphosphate and 0.2 parts of mercaptan-containing chain transfer agent are added. The resultant solution is heated to 80° C. for 90 minutes and kept for 180 minutes. The resultant is washed, dehydrated and dried to obtain styrene-acrylonitrile copolymer resin (SAN) in powder form.

(B) Polyester

Polyester resin having an intrinsic viscosity of 0.76 g/dL (product name: A1100) manufactured by Anychem Company is used.

(C) Silicone Oil (C1) Dimethyl silicone oil having a viscosity of 100 cPs manufactured by Nippon Unicar is used.

(C2) Methylhydrogen silicone oil having a viscosity of 300 cPs manufactured by KCC is used.

(D) Flame Retardant (D1) Decabromodiphenyloxide (DBDPO): SAYTEX 102E manufactured by Albemarle Corporation, US, is used.

(D2) Decabrominated diphenylethane (DBDPE): SAYTEX 4010 manufactured by Albemarle Corporation, US, is used.

(D3) Tris(tribromophenyl)triazine: FR-245 manufactured by ICL Company is used.

(E) Flame Retardant Aid

Antimony trioxide (product name: ANTIS-W) manufactured by Insung Antimony Co., Ltd. of Korea is used.

Examples 1-7 and Comparative Examples 1-5

The components as shown in Table 1 are mixed with a Hansel mixer for 3 to 10 minutes to prepare a mixture. The mixture is fed into a conventional twin screw extruder with a speed of 30 to 60 kg/hr and extruded at 180-280° C. at a screw speed of 150 to 300 rpm as pellets. The resin pellets are dried at 80° C. for 2 hours, and molded into test specimens using a 6 oz injection molding machine at 180 to 280° C. with a barrel temperature of 40 to 80° C.

The physical properties of the test specimens are measured after leaving the specimens at 23° C. and 50% relative humidity for 40 hours, and the results are shown in Tables 1 and 2.

TABLE 1

|  |  | Examples | | | | | Comparative Examples | | |
|---|---|---|---|---|---|---|---|---|---|
|  |  | 1 | 2 | 3 | 4 | 5 | 1 | 2 | 3 |
| Epoxy group-containing vinyl copolymer | A1-1 | 40 | 40 | 40 | — | 40 | 40 | — | 40 |
|  | A1-2 | — | — | — | 40 | — | — | — | — |
|  | A$_{21}$ | 30 | 30 | 30 | 30 | 30 | 30 | 30 | 30 |
|  | A$_{22}$ | — | — | — | — | — | — | 40 | — |
| Polyester |  | 30 | 30 | 30 | 30 | 30 | 30 | 30 | 30 |
| Silicone oil | C1 | 0.02 | 0.1 | 1 | 0.1 | — | — | — | 20 |
|  | C2 | — | — | — | — | 0.1 | — | — | — |
| Flame retardant | D1 | 14 | 14 | 14 | 14 | 14 | 14 | 14 | 14 |
| Antimony |  | 2.5 | 2.5 | 2.5 | 2.5 | 2.5 | 2.5 | 2.5 | 2.5 |
| Impact strength |  | 9.8 | 11.5 | 12.9 | 12.5 | 9.5 | 7.2 | 3.2 | 4.5 |
| falling dart impact strength |  | 41 | 47 | 50 | 48 | 40 | 38 | 26 | 32 |
| Flame retardancy |  | V0 | V0 | V0 | V0 | V0 | V0 | V0 | V1 |

TABLE 2

|  |  | Examples | | Comparative examples | |
|---|---|---|---|---|---|
|  |  | 6 | 7 | 4 | 5 |
| Epoxy group-containing vinyl copolymer | A1-1 | 40 | 40 | 40 | 40 |
|  | A1-2 | — | — | — | — |
|  | A$_{21}$ | 30 | 30 | 30 | 30 |
|  | A$_{22}$ | — | — | — | — |
| Polyester |  | 30 | 30 | 30 | 30 |
| Silicone oil | C1 | 0.1 | 0.1 | — | — |
|  | C2 | — | — | — | — |
| Flame retardant | D2 | 14 | — | 14 | — |
|  | D3 | — | 18 | — | 18 |
| Antimony |  | 2.5 | 2.5 | 2.5 | 2.5 |
| Impact strength |  | 18.0 | 17.2 | 13.2 | 12.7 |
| falling dart impact strength |  | 54 | 56 | 48 | 48 |
| Flame retardancy |  | V0 | V0 | V0 | V0 |

* Property Test Methods (1) Impact strength: The Izod impact strength (¼" notch, kgf·cm/cm) is measured in accordance with ASTM D-256.

(2) Falling dart impact strength (J): The falling dart impact strength is measured in accordance with ASTM-D3763 where a ball having a weight of 3.729 kg and a hemispherical diameter of 12.5 mm is allowed to fall from a height of 30 cm onto a square test piece having a thickness of 3.2 mm and a width of 80 mm, and impact absorption energy up to the time point where a first crack occurred is measured.

(3) Flame retardancy: The flame retardancy is measured in accordance with UL94 VB. The test specimens have a thickness of 1.5 mm.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A thermoplastic resin composition with improved impact resistance comprising:
    (A) about 50 to about 99 parts by weight of an epoxy group-containing styrenic polymer comprising ($A_1$) about 5 to about 100% by weight of an epoxy group-containing vinyl copolymer comprising about 0.001 to about 5.0 mol % of an epoxy compound; and ($A_2$) greater than 0 to about 95% by weight of a rubber modified styrenic copolymer resin;
    (B) about 1 to about 50 parts by weight of a polyester resin;
    (C) about 0.001 to about 10 parts by weight of a silicone oil, per 100 parts by weight of a base resin comprising (A) and (B), wherein said silicone oil (C) has a viscosity of about 1 to about 10,000 cPs (at 25° C.);
    (D) about 3 to about 20 parts by weight of a bromine-containing flame retardant, per 100 parts by weight of a base resin comprising (A) and (B); and
    (E) about 0.1 to about 6 parts by weight of a flame retardant aid, per 100 parts by weight of a base resin comprising (A) and (B).

2. The thermoplastic resin composition of claim 1, wherein said epoxy group-containing vinyl polymer ($A_1$) is prepared by polymerizing a mixture comprising about 0.001 to about 5.0 mol % of an epoxy group-containing unsaturated epoxy compound ($A_{11}$) and about 99.999 to about 95 mol % of a vinyl compound ($A_{12}$).

3. The thermoplastic resin composition of claim 2, wherein said unsaturated epoxy compound ($A_{11}$) is represented by the following chemical formula 1:

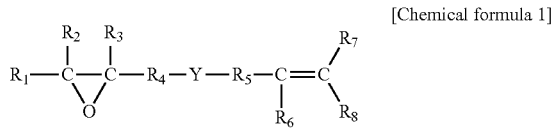

[Chemical formula 1]

wherein:
    $R_1$, $R_2$, $R_3$, $R_6$, $R_7$ and $R_8$ are each independently hydrogen, saturated or unsaturated $C_1$-$C_{12}$ alkyl, $C_6$-$C_{14}$ aryl, or alkyl-substituted aryl; and
    Y is an ether group (—O—), carboxyl group (—O—[C=O]—, —[O=C]—O—), $C_1$-$C_{12}$ alkylene, $C_6$-$C_{14}$ arylene, or alkyl-substituted arylene;
    with the proviso that when Y is an ether group (—O—) or carboxyl group (—O—[C=O]—, —[O=C]—O—), $R_4$ and $R_5$ are each independently $C_1$-$C_{12}$ alkylene, $C_6$-$C_{14}$ arylene or alkyl-substituted arylene; and when Y is $C_1$-$C_{12}$ alkylene, $C_6$-$C_{14}$ arylene or alkyl-substituted arylene, Y represents a (R4-Y—R5) structure.

4. The thermoplastic resin composition of claim 3, wherein said unsaturated epoxy compound ($A_{11}$) is selected from the group consisting of epoxy alkyl acrylate, allyl glycidyl ester, aryl glycidyl ester, glycidyl methacrylate, glycidyl acrylate, butadiene monooxide, vinyl glycidyl ether, glycidyl itaconate and combinations thereof.

5. The thermoplastic resin composition of claim 2, wherein said vinyl compound ($A_{12}$) comprises about 40 to about 90% by weight of an aromatic vinyl monomer and about 10 to about 60% by weight of a monomer copolymerizable with the aromatic vinyl monomer.

6. The thermoplastic resin composition of claim 5, wherein said copolymerizable monomer with the aromatic vinyl monomer is an unsaturated nitrile monomer.

7. The thermoplastic resin composition of claim 1, wherein said rubber modified styrenic copolymer resin ($A_2$) comprises ($A_{21}$) about 20 to about 100% by weight of a graft copolymer resin and ($A_{22}$) about 0 to about 80% by weight of a copolymer resin.

8. The thermoplastic resin composition of claim 1, wherein said rubber modified styrenic copolymer resin ($A_2$) has a Z-average rubber particle size of about 0.1 to about 6.0 μm.

9. The thermoplastic resin composition of claim 1, wherein said polyester resin (B) contains inorganic particles.

10. The thermoplastic resin composition of claim 1, wherein said silicone oil (C) is represented by the following chemical formula 2:

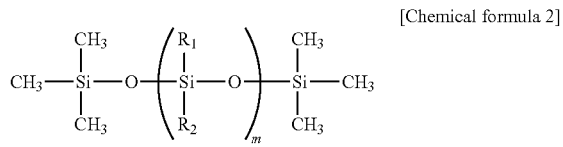

[Chemical formula 2]

wherein $R_1$ and $R_2$ are each independently $C_{1-6}$ alkyl, phenyl, $C_{6-20}$ alkyl-substituted phenyl, and hydrogen; and m is about 10 to about 10,000.

11. The thermoplastic resin composition of claim 1, wherein said bromine-containing flame retardant (D) is selected from the group consisting of tetrabromobisphenol A, decabromodiphenyloxide, decabrominated diphenyl ethane, 1,2-bis(tribromophenyl) ethane, brominated epoxy oligomer having a molecular weight of about 600 to about 8,000, octabromotrimethylphenyl indane, bis(2,3-dibromopropyl ether), tris(tribromophenyl)triazine, brominated aliphatic or aromatic hydrocarbon and combinations thereof.

12. The thermoplastic resin composition of claim 1, wherein said flame retardant aid (E) is antimony oxide.

13. The thermoplastic resin composition of claim 12, wherein said antimony oxide is antimony trioxide in which at least 50% of the antimony trioxide particles have a size of about 0.01 to about 6 μm or antimony pentoxide in which at least 50% of the antimony pentoxide particles have a size 0.01 to about 1 μm.

14. The thermoplastic resin composition of claim 1, further comprising additives selected from the group consisting of heat stabilizers, dyes, pigments, lubricants, releasing agents, dispersant, anti-dripping agents, weather stabilizers, inorganic fillers, inorganic fibers and combinations thereof.

15. A structural material comprising a thermoplastic resin composition comprising:
    (A) about 50 to about 99 parts by weight of an epoxy group-containing styrenic polymer comprising ($A_1$) about 5 to about 100% by weight of an epoxy group-containing vinyl copolymer comprising about 0.001 to about 5.0 mol % of an epoxy compound; and ($A_2$) greater than 0 to about 95% by weight of a rubber modified styrenic copolymer resin;
    (B) about 1 to about 50 parts by weight of a polyester resin;
    (C) about 0.001 to about 10 parts by weight of a silicone oil, per 100 parts by weight of a base resin comprising (A) and (B), wherein said silicone oil (C) has a viscosity of about 1 to about 10,000 cPs (at 25° C.);
    (D) about 3 to about 20 parts by weight of a bromine-containing flame retardant, per 100 parts by weight of a base resin comprising (A) and (B); and (E) about 0.1 to about 6 parts by weight of a flame retardant aid, per 100 parts by weight of a base resin comprising (A) and (B).

16. The structural material of claim 15, wherein said epoxy group-containing vinyl polymer ($A_1$) is prepared by polymerizing a mixture comprising about 0.001 to about 5.0 mol % of an epoxy group-containing unsaturated epoxy compound ($A_{11}$) and about 99.999 to about 95 mol % of a vinyl compound ($A_{12}$).

17. The structural material of claim 16, wherein said unsaturated epoxy compound ($A_{11}$) is represented by the following chemical formula 1:

[Chemical formula 1]

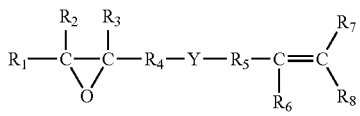

wherein:
$R_1$, $R_2$, $R_3$, $R_6$, $R_7$ and $R_8$ are each independently hydrogen, saturated or unsaturated $C_1$-$C_{12}$ alkyl, $C_6$-$C_{14}$ aryl, or alkyl-substituted aryl; and
Y is an ether group (—O—), carboxyl group (—O—[C=O]—, —[O=C]—O—), $C_1$-$C_{12}$ alkylene, $C_6$-$C_{14}$ arylene, or alkyl-substituted arylene;
with the proviso that when Y is an ether group (—O—) or carboxyl group (—O—[C=O]—, —[O=C]—O—), $R_4$ and $R_5$ are each independently $C_1$-$C_{12}$ alkylene, $C_6$-$C_{14}$ arylene or alkyl-substituted arylene; and when Y is $C_1$-$C_{12}$ alkylene, $C_6$-$C_{14}$ arylene or alkyl-substituted arylene, Y represents a (R4-Y—R5) structure.

18. The structural material of claim 15, wherein said polyester resin (B) contains inorganic particles.

19. The structural material of claim 15, wherein said silicone oil (C) is represented by the following chemical formula 2:

[Chemical formula 2]

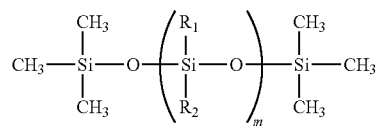

wherein $R_1$ and R2 are each independently $C_{1-6}$ alkyl, phenyl, $C_{6-20}$ alkyl-substituted phenyl, and hydrogen; and m is about 10 to about 10,000.

20. The structural material of claim 15, wherein said flame retardant aid (E) is antimony oxide.

21. The structural material of claim 20, wherein said antimony oxide is antimony trioxide in which at least 50% of the antimony trioxide particles have a size of about 0.01 to about 6 μm or antimony pentoxide in which at least 50% of the antimony pentoxide particles have a size 0.01 to about 1 μm.

22. An electric/electronic housing molded from a resin composition comprising:
(A) about 50 to about 99 parts by weight of an epoxy group-containing styrenic polymer comprising ($A_1$) about 5 to about 100% by weight of an epoxy group-containing vinyl copolymer comprising about 0.001 to about 5.0 mol % of an epoxy compound; and ($A_2$) greater than 0 to about 95% by weight of a rubber modified styrenic copolymer resin;
(B) about 1 to about 50 parts by weight of a polyester resin;
(C) about 0.001 to about 10 parts by weight of a silicone oil, per 100 parts by weight of a base resin comprising (A) and (B), wherein said silicone oil (C) has a viscosity of about 1 to about 10,000 cPs (at 25° C.);
(D) about 3 to about 20 parts by weight of a bromine-containing flame retardant, per 100 parts by weight of a base resin comprising (A) and (B); and
(E) about 0.1 to about 6 parts by weight of a flame retardant aid, per 100 parts by weight of a base resin comprising (A) and (B).

23. The housing of claim 22, wherein said epoxy group-containing vinyl polymer ($A_1$) is prepared by polymerizing a mixture comprising about 0.001 to about 5.0 mol % of an epoxy group-containing unsaturated epoxy compound ($A_{11}$) and about 99.999 to about 95 mol % of a vinyl compound ($A_{12}$).

24. The housing of claim 23, wherein said unsaturated epoxy compound ($A_{11}$) is represented by the following chemical formula 1:

[Chemical formula 1]

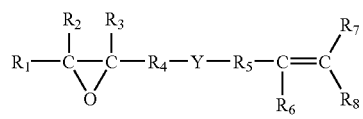

wherein:
$R_1$, $R_2$, $R_3$, $R_6$, $R_7$ and $R_8$ are each independently hydrogen, saturated or unsaturated $C_1$-$C_{12}$ alkyl, $C_6$-$C_{14}$ aryl, or alkyl-substituted aryl; and
Y is an ether group (—O—), carboxyl group (—O—[C=O]—, —[O=C]—O—), $C_1$-$C_{12}$ alkylene, $C_6$-$C_{14}$ arylene, or alkyl-substituted arylene;
with the proviso that when Y is an ether group (—O—) or carboxyl group (—O—[C=O]—, —[O=C]—O—), $R_4$ and $R_5$ are each independently $C_1$-$C_{12}$ alkylene, $C_6$-$C_{14}$ arylene or alkyl-substituted arylene; and when Y is $C_1$-$C_{12}$ alkylene, $C_6$-$C_{14}$ arylene or alkyl-substituted arylene, Y represents a (R4-Y—R5) structure.

25. The housing of claim 22, wherein said polyester resin (B) contains inorganic particles.

26. The housing of claim 22, wherein said silicone oil (C) is represented by the following chemical formula 2:

[Chemical formula 2]

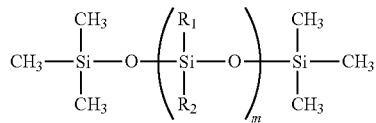

wherein $R_1$ and R2 are each independently $C_{1-6}$ alkyl, phenyl, $C_{6-20}$ alkyl-substituted phenyl, and hydrogen; and m is about 10 to about 10,000.

27. The housing of claim 22, wherein said flame retardant aid (E) is antimony oxide.

28. The housing of claim 27, wherein said antimony oxide is antimony trioxide in which at least 50% of the antimony trioxide particles have a size of about 0.01 to about 6 μm or antimony pentoxide in which at least 50% of the antimony pentoxide particles have a size 0.01 to about 1 μm.

29. The thermoplastic resin composition of claim 1, comprising:
(A) about 60 to about 99 parts by weight of said epoxy group-containing styrenic polymer comprising ($A_1$) about 5 to about 100% by weight of an epoxy group-containing vinyl copolymer comprising about 0.001 to about 5.0 mol % of an epoxy compound; and ($A_2$) greater than 0 to about 95% by weight of a rubber modified styrenic copolymer resin; and
(B) about 1 to about 40 parts by weight of said polyester resin.

30. The thermoplastic resin composition of claim 29, comprising:
(A) about 70 to about 99 parts by weight of said epoxy group-containing styrenic polymer comprising ($A_1$) about 5 to about 100% by weight of an epoxy group-containing vinyl copolymer comprising about 0.001 to about 5.0 mol % of an epoxy compound; and ($A_2$) greater than 0 to about 95% by weight of a rubber modified styrenic copolymer resin; and
(B) about 1 to about 30 parts by weight of said polyester resin.

31. A thermoplastic resin composition with improved impact resistance comprising:
(A) about 50 to about 99 parts by weight of an epoxy group-containing styrenic polymer comprising ($A_1$) about 5 to about 100% by weight of an epoxy group-containing vinyl copolymer comprising about 0.001 to about 5.0 mol % of an epoxy compound; and ($A_2$) about 0 to about 95% by weight of a rubber modified styrenic copolymer resin;
(B) about 1 to about 50 parts by weight of a polyester resin;
(C) about 0.001 to about 10 parts by weight of a silicone oil, per 100 parts by weight of a base resin comprising (A) and (B), wherein said silicone oil (C) has a viscosity of about 1 to about 10,000 cPs (at 25° C.);
(D) about 3 to about 20 parts by weight of a bromine-containing flame retardant, per 100 parts by weight of a base resin comprising (A) and (B); and
(E) about 0.1 to about 6 parts by weight of a flame retardant aid, per 100 parts by weight of a base resin comprising (A) and (B).

32. The thermoplastic resin composition of claim 31, comprising:
(A) about 60 to about 99 parts by weight of said epoxy group-containing styrenic polymer comprising ($A_1$) about 5 to about 100% by weight of an epoxy group-containing vinyl copolymer comprising about 0.001 to about 5.0 mol % of an epoxy compound; and ($A_2$) about 0 to about 95% by weight of a rubber modified styrenic copolymer resin; and
(B) about 1 to about 40 parts by weight of said polyester resin.

33. The thermoplastic resin composition of claim 32, comprising:
(A) about 70 to about 99 parts by weight of said epoxy group-containing styrenic polymer comprising ($A_1$) about 5 to about 100% by weight of an epoxy group-containing vinyl copolymer comprising about 0.001 to about 5.0 mol % of an epoxy compound; and ($A_2$) about 0 to about 95% by weight of a rubber modified styrenic copolymer resin; and
(B) about 1 to about 30 parts by weight of said polyester resin.

34. The thermoplastic resin composition of claim 1, wherein said polyester resin is prepared by condensation polymerization reaction of an acid or ester selected from the group consisting of terephthalic acid, isophthalic acid, 1,2-naphthalene dicarboxylic acid, 1,4-naphthalenedicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid, 2,7-naphthalenedicarboxylic acid, dimethyl terephthalate, dimethyl isophthalate, alkyl esters of naphthalene dicarboxylate, dimethyl-1,2-naphthalate, dimethyl-1,5-naphthalate, dimethyl-1,7-naphthalate, dimethyl-1,7-naphthalate, dimethyl-1,8-naphthalate, dimethyl-2,3-naphthalate, dimethyl-2,6-naphthalate, dimethyl-2,7-naphthalate, and combinations thereof; and a diol having 2 to 12 carbon atoms selected from the group consisting of ethylene glycol, 1,2-propylene glycol, 1,3-propylene glycol, 2,2-dimethyl-1,3-propanediol, 2,2-dimethyl-1,3-propylene glycol, 1,3-butanediol, 1,4-butanediol, 1,5-pentanediol, 1,6-hexanediol, 1,3-cyclohexane dimethanol, 1,4-cyclohexane dimethanol, and combinations thereof.

35. The thermoplastic resin composition of claim 1, wherein said epoxy group-containing vinyl polymer ($A_1$) is prepared by polymerizing a mixture comprising about 0.001 to about 5.0 mol % of an epoxy group-containing unsaturated epoxy compound ($A_{11}$) and about 99.999 to about 95 mol % of a vinyl compound ($A_{12}$) comprising an aromatic vinyl monomer.

36. The thermoplastic resin composition of claim 35, wherein said vinyl compound ($A_{12}$) is a copolymer comprising about 40 to about 90% by weight of an aromatic vinyl monomer and about 10 to about 60% by weight of an unsaturated nitrile monomer.

37. The thermoplastic resin composition of claim 36, wherein said rubber modified styrenic copolymer resin ($A_2$) comprises ($A_{21}$) about 20 to about 100% by weight of a graft copolymer resin prepared by graft-polymerizing rubbery polymer, aromatic vinyl monomer, and monomer copolymerizable with the aromatic vinyl monomer and ($A_{22}$) about 0 to about 80% by weight of a copolymer resin.

* * * * *